US012064962B2

(12) United States Patent
Yanase

(10) Patent No.: US 12,064,962 B2
(45) Date of Patent: Aug. 20, 2024

(54) LIQUID DISCHARGE APPARATUS

(71) Applicant: Norikazu Yanase, Kanagawa (JP)

(72) Inventor: Norikazu Yanase, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/093,351

(22) Filed: Jan. 5, 2023

(65) Prior Publication Data

US 2023/0241884 A1 Aug. 3, 2023

(30) Foreign Application Priority Data

Feb. 3, 2022 (JP) ................................ 2022-015896
Nov. 10, 2022 (JP) ................................ 2022-180587

(51) Int. Cl.
*B41J 2/045* (2006.01)

(52) U.S. Cl.
CPC ....... *B41J 2/04505* (2013.01); *B41J 2/04583* (2013.01)

(58) Field of Classification Search
CPC .. B41J 2/04505; B41J 2/04583; B41J 3/4078; B41J 2/2132; B41J 2/2135; B41J 25/001; B41J 11/00; B41J 11/001; B41J 11/007; B41J 11/0025; B41J 11/0055; B41J 11/42; B41J 11/425; B41J 11/55; B41J 15/04; B41J 13/00; B41J 13/0009; B41J 13/103; B41J 13/0018; B41J 13/0027; B41J 13/0036; B41J 13/32
See application file for complete search history.

(56) References Cited

U.S. PATENT DOCUMENTS

2003/0016983 A1* 1/2003 Baldwin-Garcia ...... B41J 3/543 400/149
2005/0179708 A1 8/2005 Ben-Zur
2008/0259110 A1* 10/2008 Korem .................. B41J 25/001 347/16
2009/0091785 A1 4/2009 Yokouchi et al.
2011/0273511 A1 11/2011 Yanase et al.
(Continued)

FOREIGN PATENT DOCUMENTS

JP 11-254759 9/1999
JP 2000-282373 10/2000
(Continued)

OTHER PUBLICATIONS

Partial European Search Report issued Jun. 16, 2023 in European Patent Application No. 22215423.9, 16 pages.

*Primary Examiner* — Kristal Feggins
(74) *Attorney, Agent, or Firm* — XSENSUS LLP

(57) ABSTRACT

A liquid discharge apparatus includes: a liquid discharge head configured to discharge a liquid onto a printing medium to form an image on the printing medium; a conveyor configured to convey the printing medium to the liquid discharge head in a conveyance direction; a carriage mounting the liquid discharge head, the carriage configured to move the liquid discharge head in a first direction orthogonal to the conveyance direction; and a controller configured to calculate a control parameter to shift a printing position of the liquid discharge head in at least one of the first direction or the conveyance direction for each time the conveyor conveying the printing medium.

10 Claims, 9 Drawing Sheets

(56) References Cited

U.S. PATENT DOCUMENTS

| | | | | |
|---|---|---|---|---|
| 2014/0020189 | A1* | 1/2014 | Weibel | B41J 3/4078 134/169 C |
| 2014/0029023 | A1 | 1/2014 | Yanase et al. | |
| 2014/0097288 | A1 | 4/2014 | Yanase et al. | |
| 2015/0077459 | A1 | 3/2015 | Yanase et al. | |
| 2016/0031239 | A1 | 2/2016 | Yanase et al. | |
| 2018/0313033 | A1 | 11/2018 | Yanase et al. | |
| 2019/0009586 | A1 | 1/2019 | Yanase et al. | |
| 2021/0283914 | A1 | 9/2021 | Yanase | |
| 2022/0055386 | A1 | 2/2022 | Yanase et al. | |

FOREIGN PATENT DOCUMENTS

| | | |
|---|---|---|
| JP | 2009-061758 | 3/2009 |
| JP | 2009-078415 | 4/2009 |
| JP | 2010-228329 | 10/2010 |

* cited by examiner

FIG. 10

EXAMPLE (MINIMUM CONTROL WIDTH: 25 μm)

| ORDER OF HEAD LENGTH | EXAMPLE WITH ORTHOGONALITY OF 32 μm (/ HEAD LENGTH) | | EXAMPLE WITH ORTHOGONALITY OF 8 μm (/ HEAD LENGTH) | |
|---|---|---|---|---|
| | COUNT | FRACTION | COUNT | FRACTION |
| 1 | 1 | 7 | 0 | 8 |
| 2 | 1 | 14 | 0 | 16 |
| 3 | 1 | 21 | 0 | 24 |
| 4 | 2 | 3 | 1 | 7 |
| 5 | 1 | 10 | 0 | 15 |
| 6 | 1 | 17 | 0 | 23 |
| 7 | 1 | 24 | 1 | 6 |
| 8 | 2 | 6 | 0 | 14 |
| 9 | 1 | 13 | 0 | 22 |
| 10 | 1 | 20 | 1 | 5 |

LIQUID DISCHARGE APPARATUS

CROSS-REFERENCE TO RELATED APPLICATIONS

This patent application is based on and claims priority pursuant to 35 U.S.C. § 119(a) to Japanese Patent Application No. 2022-015896, filed on Feb. 3, 2022, and Japanese Patent Application No. 2022-180587, filed on Nov. 10, 2022, in the Japan Patent Office, the entire disclosure of each of which is hereby incorporated by reference herein.

BACKGROUND

Technical Field

The present disclosure relates to a liquid discharge apparatus.

Related Art

There is a technology that includes two carriages in an inkjet printer so as to increase a printing speed and, in consequence, improve productivity, and increase a number of colors usable for printing larger. In addition, there is a technology that operates two carriages in opposite directions so as to compensate inertial forces generated upon acceleration and deceleration of the carriages with each other and reduce vibration of the inkjet printer.

SUMMARY

In an aspect of the present disclosure, a liquid discharge apparatus includes: a liquid discharge head configured to discharge a liquid onto a printing medium to form an image on the printing medium; a conveyor configured to convey the printing medium to the liquid discharge head in a conveyance direction; a carriage mounting the liquid discharge head, the carriage configured to move the liquid discharge head in a first direction orthogonal to the conveyance direction; and a controller configured to calculate a control parameter to shift a printing position of the liquid discharge head in at least one of the first direction or the conveyance direction for each time the conveyor conveying the printing medium.

BRIEF DESCRIPTION OF THE DRAWINGS

The aforementioned and other aspects, features, and advantages of the present disclosure will be better understood by reference to the following detailed description when considered in connection with the accompanying drawings, wherein:

FIG. 10 is a diagram for explaining an example of the process for printing position adjustment performed by the liquid discharge apparatus according to the embodiment.

Figure 1:
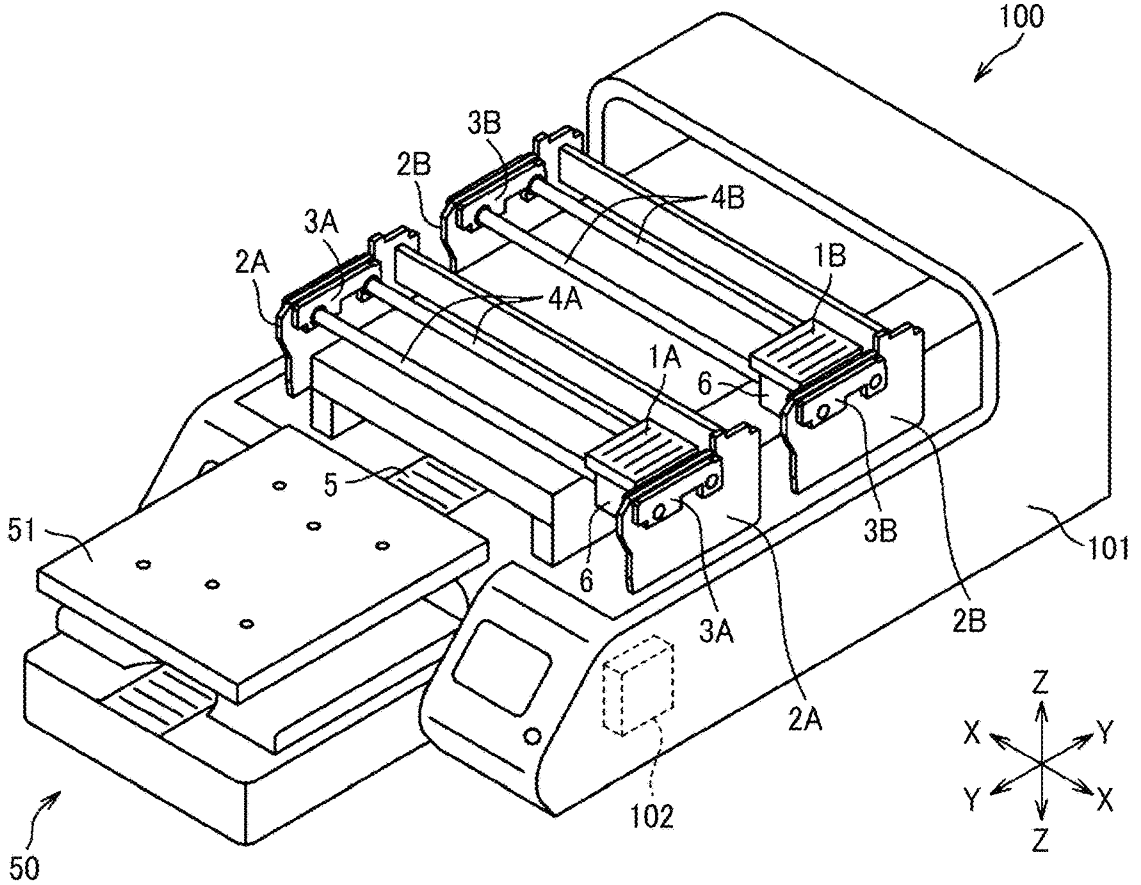
FIG. 1 is a perspective view of an example of a liquid discharge apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in an analogous manner, and achieve similar results.

Although the embodiments are described with technical limitations with reference to the attached drawings, such description is not intended to limit the scope of the disclosure and all the components or elements described in the embodiments of this disclosure are not necessarily indispensable. As used herein, the singular forms “a”, “an”, and “the” are intended to include the plural forms as well, unless the context clearly indicates otherwise.

Referring now to the drawings, embodiments of the present disclosure are described below. As used herein, the singular forms “a,” “an,” and “the” are intended to include the plural forms as well, unless the context clearly indicates otherwise.

In the following, an embodiment of a liquid discharge apparatus according to the present disclosure is described in detail with reference to the accompanying drawings.

FIG. 1 is a perspective view of an example of a liquid discharge apparatus according to an embodiment of the present disclosure. In FIG. 1, an X direction is a main scanning direction or a left and right direction of a liquid discharge apparatus 100. In FIG. 1, a Y direction is a conveyance direction of a fabric (printing target or target of liquid application) or a direction opposite to the conveyance direction, namely, a front and rear direction of the liquid discharge apparatus 100. In FIG. 1, a Z direction is an up and down direction of the liquid discharge apparatus 100. The X, Y, and Z directions are orthogonal to one another.

As illustrated in FIG. 1, the liquid discharge apparatus 100 according to the present embodiment includes a first carriage 1A, a second carriage 1B, first side panels 2A making a pair, second side panels 2B making a pair, first adjustment plates 3A as a pair of holding members, second adjustment plates 3B as a pair of holding members, first guide rods 4A as a pair of guide members, and second guide rods 4B as a pair of guide members. In the description below, the first carriage 1A and the second carriage 1B are collectively referred to as a carriage 1 if not distinguished from each other, the first side panels 2A and the second side panels 2B are collectively referred to as side panels 2 if not distinguished from each other, the first adjustment plates 3A and the second adjustment plates 3B are collectively referred to as adjustment plates 3 if not distinguished from each other, and the first guide rods 4A and the second guide rods 4B are collectively referred to as guide rods 4 if not distinguished from each other.

The side panels 2 are provided on both sides in the left and right direction of the liquid discharge apparatus 100, respectively, and are secured to a main body 101 of the liquid discharge apparatus 100. The side panels 2 hold the adjustment plates 3 movably in the Y direction and the Z direction.

The guide rods 4 are each held by the adjustment plates 3 at both ends. The adjustment plates 3 each hold the two guide rods 4 in the Y direction.

The carriage 1 is so supported on the guide rods 4 as to be movable on the guide rods 4. In other words, the carriage 1 operates in the X direction (an example of a first operating direction) orthogonal to the conveyance direction (Y direction), in which the fabric (an exemplary printing medium) as a printing target or a target of liquid application is conveyed. The carriage 1 includes a plurality of liquid discharge heads 6. Hereinafter, the liquid discharge heads 6 is referred simply as a "head 6".

The heads 6 are an example of heads that discharge liquid such as ink onto the fabric (an exemplary printing medium) as a printing target or a target of liquid application so as to form (print) an image (print image). The heads 6 have nozzle faces provided on a bottom face side of the heads 6.

On the main body 101 of the liquid discharge apparatus 100, a rail 5 is so provided as to extend in the Y direction.

A cassette 50 is attached to and detached from the liquid discharge apparatus 100.

The cassette 50 includes a stage 51 arranged in an upper portion of the cassette 50. The cassette 50 holds the fabric as a printing target or a target of liquid application on the stage 51.

The cassette 50 is attached to the liquid discharge apparatus 100 so as to move the stage 51 onto the rail 5 of the liquid discharge apparatus 100. The stage 51 moves on the rail 5 downstream in a conveyance direction of the stage 51. In other words, the rail 5 is an example of a rail to allow the stage 51 to operate or a rail to guide a movement of the stage 51. The stage 51 moves along a conveyance direction in which the rail 5 extends. The cassette 50, the stage 51, and the rail 5 form a conveyor to convey the fabric to the heads 6 in the conveyance direction (sub-scanning direction Y).

An operating direction of the carriage 1 and the direction, in which the rail 5 extends, namely, an operating direction of the stage 51 are orthogonal to each other. Under such circumstances, the carriage 1 reciprocates on the guide rods 4 in the X direction and, at the same time, the heads 6 of the carriage 1 discharge ink as liquid onto the fabric on the stage 51. An image is thus formed on the fabric.

The liquid discharge apparatus 100, which includes multiple carriages 1, allows inks in different colors to be discharged onto the fabric and increases the speed at printing on the fabric so as to improve the productivity of the apparatus.

It is known that, if two carriages are installed in a liquid discharge apparatus such as an inkjet printer, the printing speed is increased and the productivity is improved, or the number of colors usable for printing is made larger. In addition, a technology for operating two carriages in opposite directions so as to compensate inertial forces generated upon acceleration and deceleration of the carriages with each other and reduce vibration of a main body of the liquid discharge apparatus is known. In this regard, adequate consideration is not given to the fact that, in a conventional inkjet printer performing printing with two carriages, parallelism of operating directions of the two carriages is not maintained.

In the present embodiment, the liquid discharge apparatus 100 as an inkjet printer or the like, which performs printing with the two carriages 1, includes a controller 102 as a means for adjusting a printing position if the parallelism of operating directions of the two carriages 1 is not maintained. The present embodiment is described on the premise that the carriage 1 is held by the guide rods 4, while the same description applies to the case in which the carriage 1 is held by a rail or by one guide rod 4 and one rail.

To be specific: If, in the liquid discharge apparatus 100 as an inkjet printer or the like, which performs printing with the two carriages 1, the parallelism of the operating directions of the two carriages 1 is not maintained, the printing position is dislocated at both left and right ends on a rear end side (downstream in the conveyance direction of the stage 51) even if the printing position is correct at both left and right ends on a front end side (upstream in the conveyance direction of the stage 51) with respect to both of the two carriages 1, for instance. In addition, one of the two carriages 1 has a deviating orthogonality to the conveyance direction of the stage 51, so that the result of printing with the carriage 1 having a deviating orthogonality to the conveyance direction of the stage 51 is that the printing position is dislocated stepwise. For the sake of simple explanation, deviation of the printing position is exaggeratedly illustrated in FIGS. 2 and 3, although the deviation is not considerable to that extent because the apparatus is actually assembled attempting to make the parallelism of the two carriages 1 maintained and the operating directions of the carriages 1 agree with each other in orthogonality to the conveyance direction of the stage 51.

Figure 2:
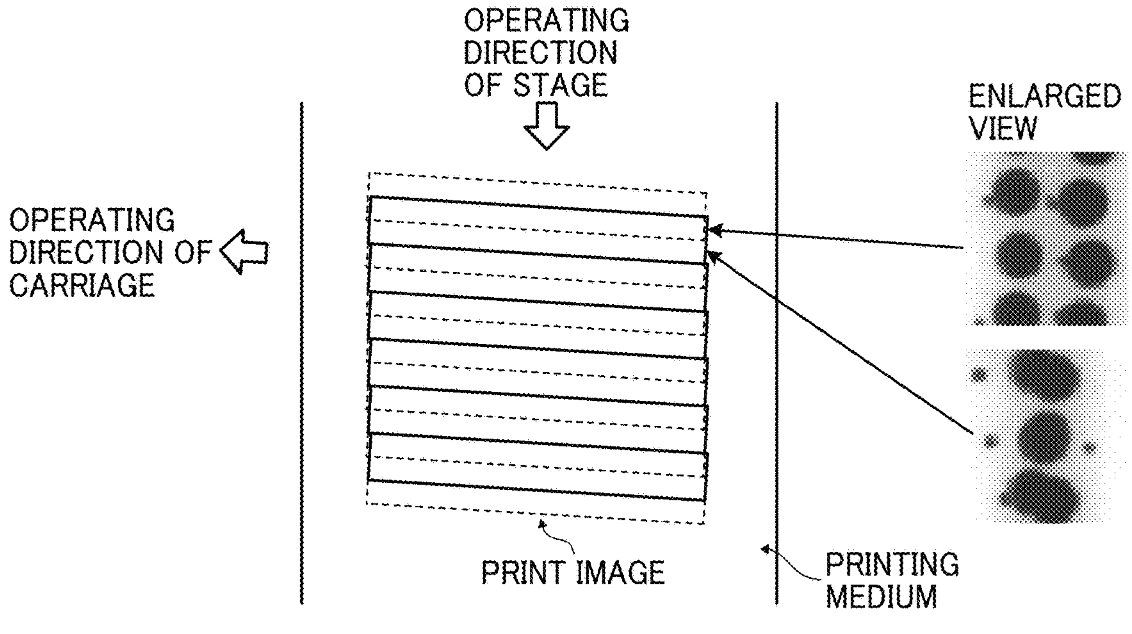
FIG. 2 is a diagram for explaining an example of a process for printing position adjustment in the liquid discharge apparatus according to the embodiment.
Figure 3:
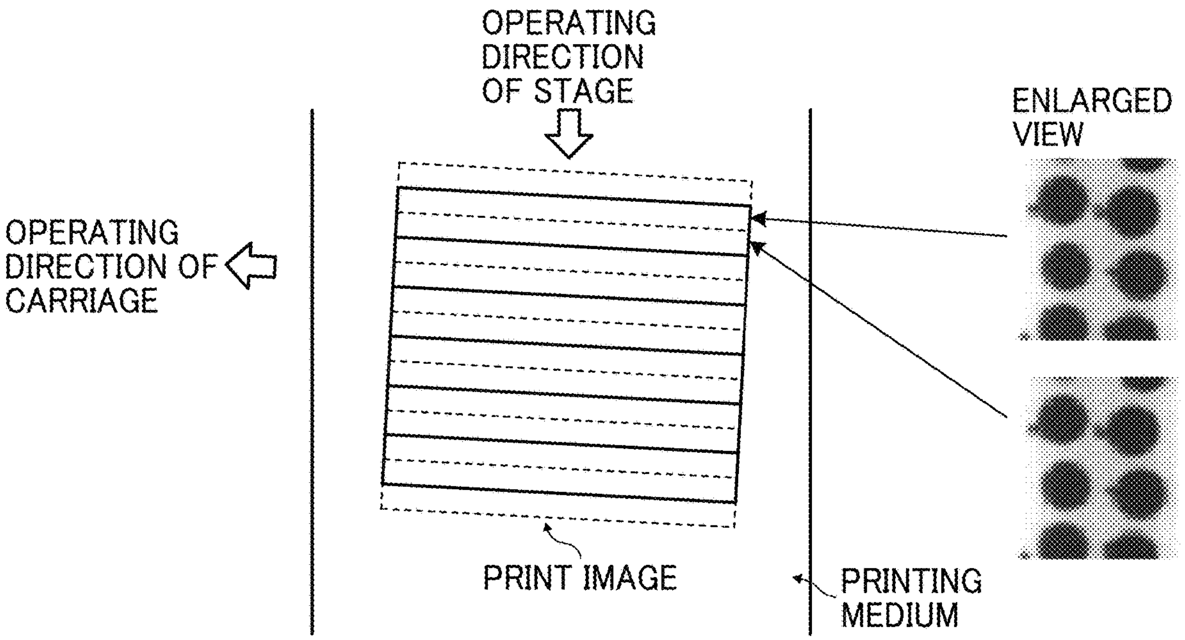
FIG. 3 is a diagram for explaining an example of the process for printing position adjustment in the liquid discharge apparatus according to the embodiment.

FIGS. 2 and 3 are diagrams for explaining an example of a process for printing position adjustment in the liquid discharge apparatus 100 according to the present embodiment. Specifically, FIG. 2 is a diagram illustrating an example of a print image obtained if the orthogonality between the conveyance direction of the stage 51 and the operating direction of the carriage 1 deviates. The print image illustrated is a print image in which one line extending in the main scanning direction is imaged by two operations of the carriage 1.

One operation of the carriage 1 is represented by a rectangle. If the orthogonality between the operating direction of the stage 51 and a scanning direction of the carriage 1 deviates, liquid such as ink may land at the same place unexpectedly, as illustrated in FIG. 2. An enlarged view in FIG. 2 illustrates a state in which ink has unexpectedly landed at the same place. If ink has unexpectedly landed at the same place, such place is thin in the print image as compared with other places. The thin place occurs in a strip in the print image, so that the print image undergoes color unevenness in density as a whole.

In the present embodiment, a means for removing the color unevenness, which occurs if the orthogonality between the conveyance direction of the stage 51 and the operating direction of the carriage 1 deviates, is provided. Specifically, the controller 102 of the liquid discharge apparatus 100 according to the present embodiment produces a test image or the like, measures an amount of stepped deviation in the main scanning direction from an ideal print image (the test image), and shifts a soft count so that the amount of stepped deviation may vanish.

Specifically, the controller 102 (an example of a calculator) of the liquid discharge apparatus 100 according to the present embodiment calculates a control parameter for moving a printing position in the operating direction of the carriage 1 stepwise for each line feed. In other words, the controller 102 calculates, each time a printing medium such as a fabric is conveyed (each time the printing medium is conveyed in a sub-scanning direction), a control parameter for moving, in at least one of the operating direction of the carriage 1 or the direction, in which the printing medium is conveyed, the printing position in the operating direction of the carriage 1. That is to say, the controller 102 calculates, each time the printing medium is conveyed, a control parameter for moving, in the main scanning direction and the sub-scanning direction, the printing position in the operating direction of the carriage 1. During such calculation, the controller 102 calculates a control parameter for adjusting orthogonality between the operating direction of the carriage 1 and the direction, in which the rail 5 extends. In the present embodiment, the liquid discharge apparatus 100 includes multiple carriages 1. Consequently, the controller 102 calculates the control parameters for each carriage 1. As a result, the orthogonality between the operating direction of the carriage 1 and the direction, in which the rail 5 extends, is adjusted for each carriage 1.

Figure 4:
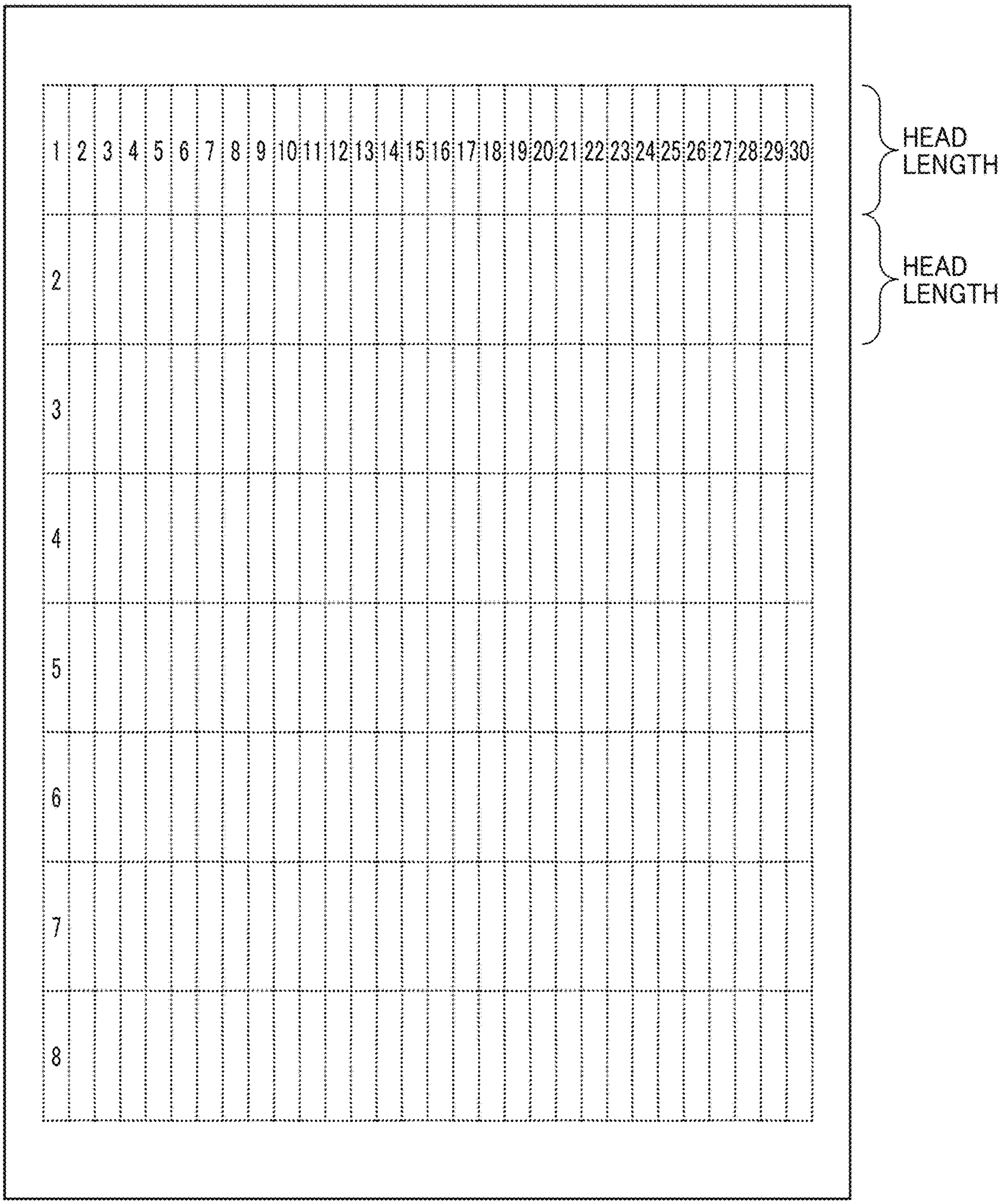
FIG. 4 is a diagram for explaining an example of the process for printing position adjustment in the liquid discharge apparatus according to the embodiment.

FIGS. 4 through 7 are diagrams for explaining an example of the process for printing position adjustment in the liquid discharge apparatus 100 according to the present embodiment. For instance, the controller 102 of the liquid discharge apparatus 100 prints, with the carriage 1 (an example of a printing unit), a print image (an example of an adjustment image) with vertical lines each having rifts recognized at intervals of a length (hereinafter referred to as a head length) of the heads 6, as illustrated in FIG. 4.

In the present embodiment, the controller 102 of the liquid discharge apparatus 100 prints the print image with vertical lines each having rifts recognized at intervals of the head length of the heads 6 as an example of the adjustment image, while any other print image will do as long as the print image is printed as an adjustment image facilitating the adjustment of the printing position of the carriage 1.

For instance, the controller 102 may print an image indicating a line feed position of the carriage 1 as an example of the adjustment image. In other words, the controller 102 may print, as an example of the adjustment image, a print image including an image indicating a conveyance position of the printing medium. Thus, the adjustment image facilitating the adjustment of the printing position of the carriage 1 is printed so that the controller 102 can adjust the parallelism of the two carriages 1 and the orthogonality between the operating direction of carriage 1 and the conveyance direction, in which the rail 5 extends.

Figure 5:
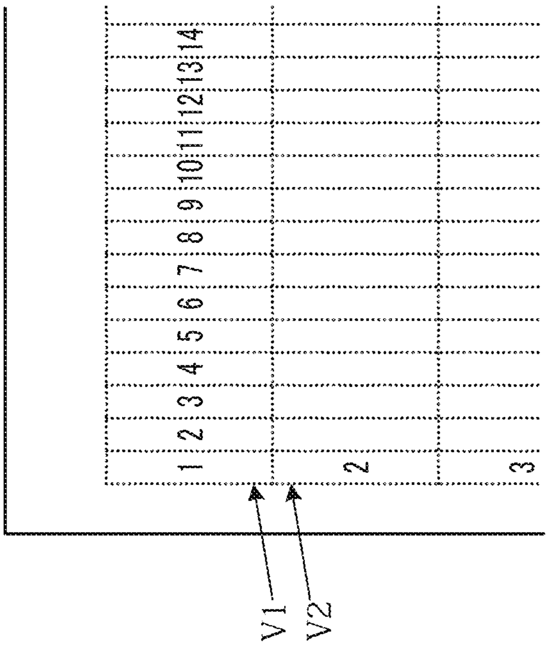
FIG. 5 is a diagram for explaining an example of the process for printing position adjustment in the liquid discharge apparatus according to the embodiment.

In another embodiment, the controller 102 actually measures an amount of deviation (amount of deviation in the main scanning direction) of lines V1 and V2 adjacent to each other in the sub-scanning direction, as illustrated in FIG. 5.

In FIG. 5, a theoretical line which has to be theoretically one linear straight line is printed to measure an amount of deviation between a line actually printed and the theoretical line. If the orthogonality between the operation direction of the stage and the operating direction of the carriage deviates, the lines V1 and V2 deviates according to the deviation of the orthogonality.

Figure 6:
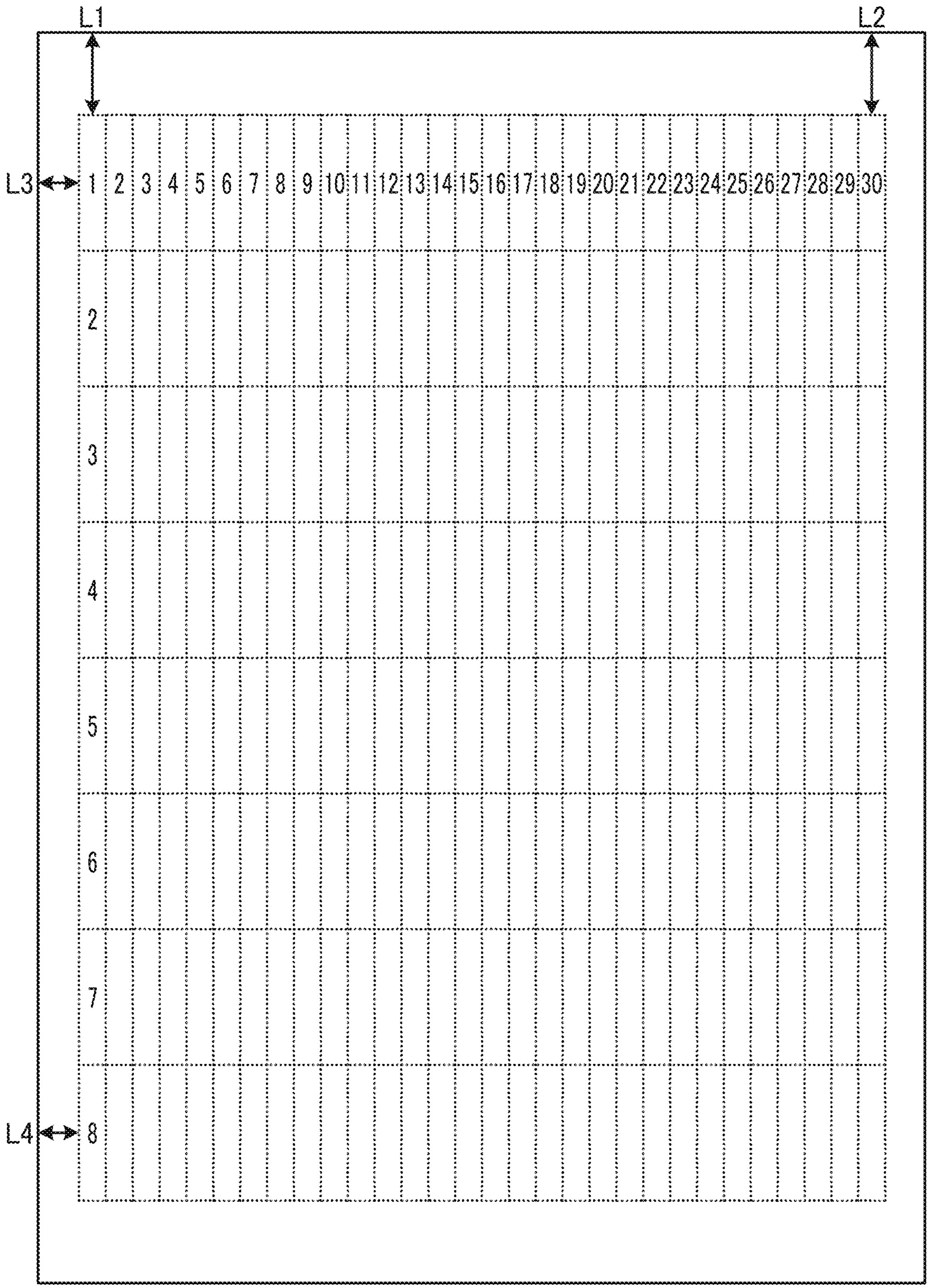
FIG. 6 is a diagram for explaining an example of the process for printing position adjustment in the liquid discharge apparatus according to the embodiment.

In yet another embodiment, the controller 102 measures distances L1 through L4 each separating an edge of a sheet (an example of the printing medium) and a line as illustrated in FIG. 6, so as to find the amount of deviation of lines adjacent to each other in the sub-scanning direction by conversion. Specifically, the amount of deviation of lines adjacent to each other in the sub-scanning direction is found by conversion using Equation (1) below.

$$\{L4-L3/(\text{distance from } L4 \text{ to } L3)\}-\{L2-L1/(\text{distance from } L1 \text{ to } L2)\}\times\text{head length}=\text{orthogonality per head length} \quad (1)$$

Figure 7:
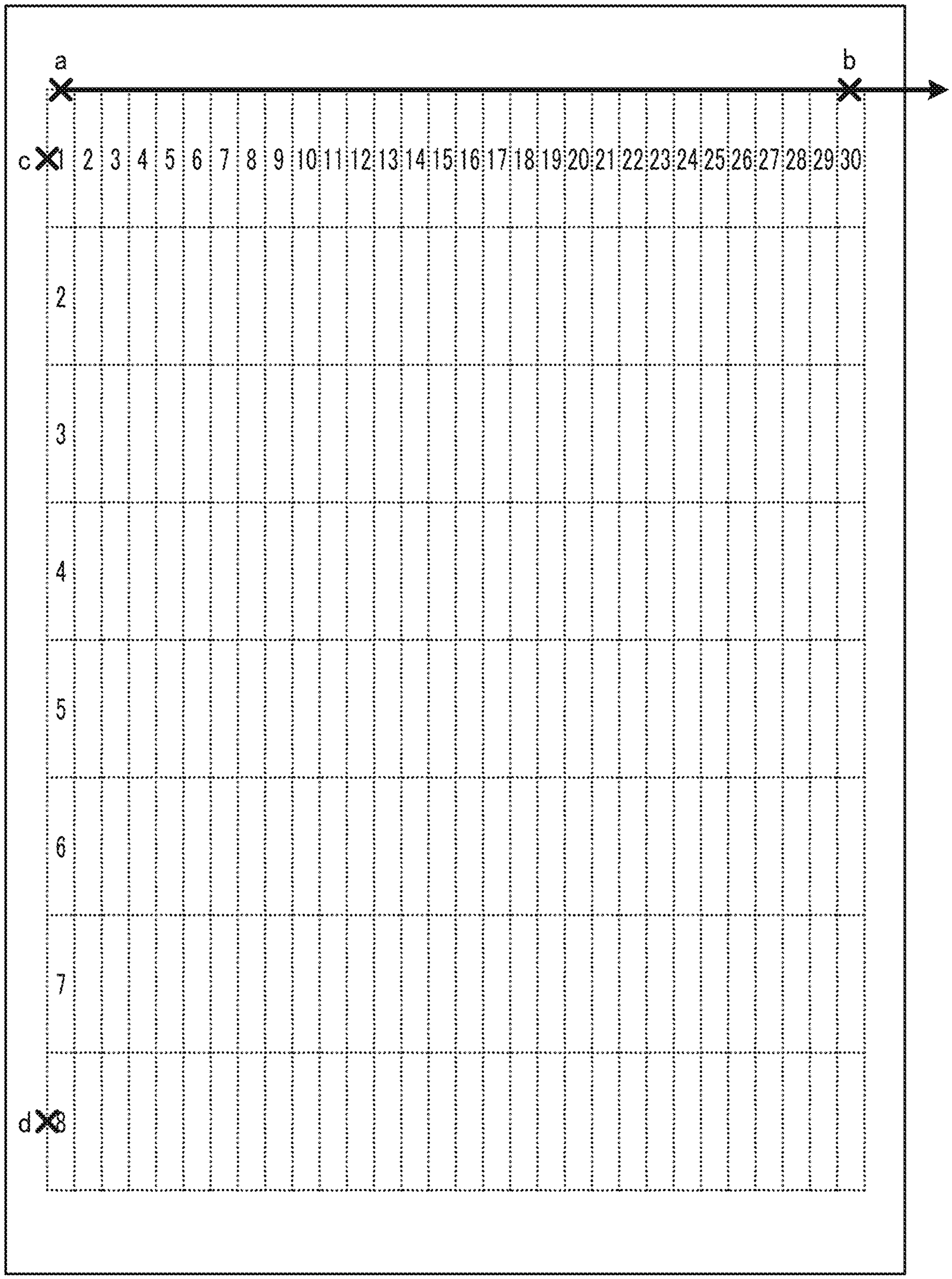
FIG. 7 is a diagram for explaining an example of the process for printing position adjustment in the liquid discharge apparatus according to the embodiment.

If a measuring instrument allowing two-dimensional measurement of coordinates is installed, the controller 102 uses the measuring instrument to measure coordinates of points a through d in a print image as illustrated in FIG. 7, and measures coordinates of the points c and d assuming a line connecting the point a and the point b as an axis, so as to calculate the amount of deviation of lines adjacent to each other in the sub-scanning direction.

As described above, in the liquid discharge apparatus 100 according to the present embodiment, the adjustment image illustrated in FIGS. 4 through 7, or the like is printed, and the adjustment image is used to measure the amount of deviation of lines adjacent to each other in the sub-scanning direction so as to measure the orthogonality between the operating direction of the stage 51 and the operating direction of the carriage 1. Based on the result of measurement of such orthogonality, the controller 102 of the liquid discharge apparatus 100 shifts the soft count (an exemplary control parameter). In other words, the controller 102 of the liquid discharge apparatus 100 according to the present embodiment performs control to gradually move the printing position during the respective operations of the carriage 1, in the left and right direction (leftward or rightward), that is to say, in the main scanning direction, so as to shift the soft count for each line feed (operation) of the carriage 1 (each time the printing medium is conveyed). Consequently, the printing position in the operating direction of the carriage 1 is intentionally moved stepwise and by degrees. As a result, an ideal print image in which the stepped deviation in the main scanning direction is suppressed is attained, as illustrated in FIG. 3.

If an image of one line extending in the main scanning direction is formed by two passes of the heads 6 with a head length of 32 mm so as to form a print image at a dot spacing of 1200 dots per inch (dpi) in the main scanning direction, as illustrated in FIG. 2, for instance, deviation by one dot in the main scanning direction occurs between a line at the upper right in the print image in FIG. 2 and a line at the lower right in the print image in FIG. 2. In other words, the deviation by one dot occurs at 1200 dpi per 16 mm, so that an amount of stepped deviation of the printing position in the main scanning direction is suppressed if the printing position is moved by 25.4 mm/1200 dpi=0.0212 mm (/16 mm), that is to say, moved by 0.0212 mm per 16 mm.

Figure 8:
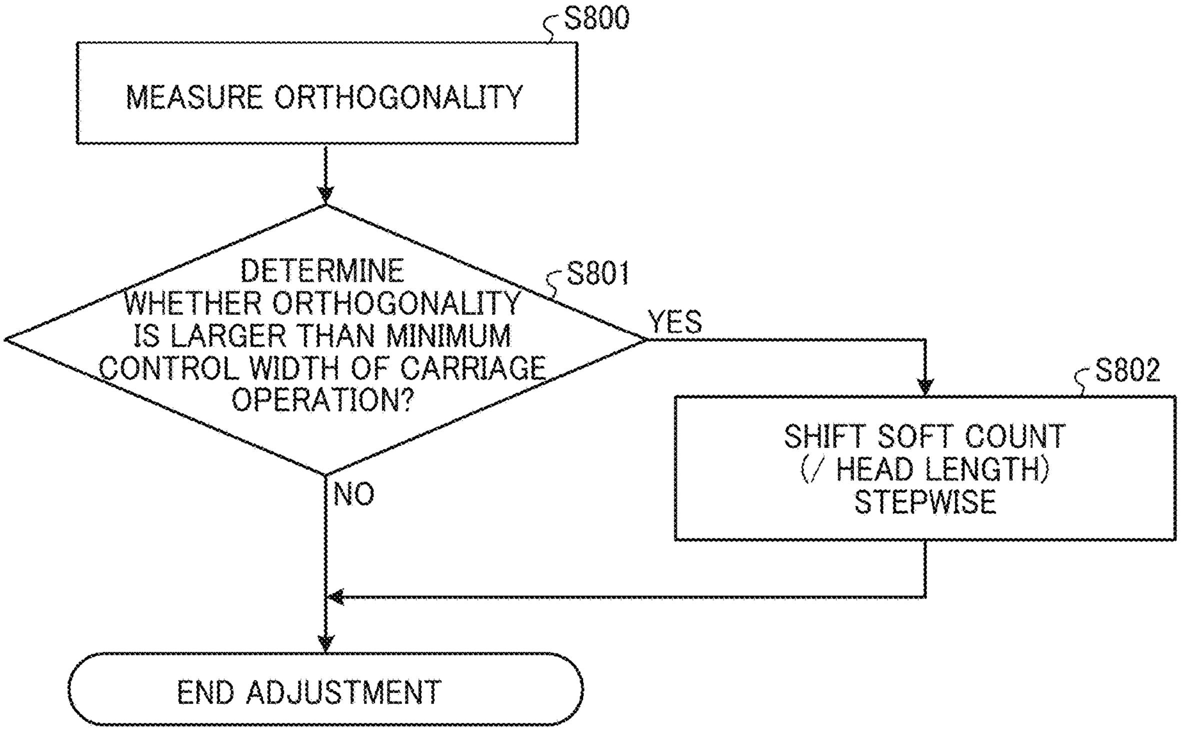
FIG. 8 is a flowchart illustrating an example of a flow of a process for a single printing position adjustment that is performed by the liquid discharge apparatus according to the embodiment.

FIG. 8 is a flowchart illustrating an example of a flow of a process for a single printing position adjustment that is performed by the liquid discharge apparatus 100 according to the present embodiment. In order to cope with the stepped deviation of the printing position in the main scanning direction, that is to say, in order to suppress image unevenness, it is desirable to shift the soft count for each line feed width of the stage 51 (each time the printing medium is conveyed). Specifically, the orthogonality between the operating direction of the stage 51 and the operating direction of the carriage 1 is measured (S800). Then, the controller 102 of the liquid discharge apparatus 100 determines whether the measured orthogonality is larger than a minimum control width of the operation of the carriage 1 (step S801). The minimum control width is 1200 dpi (i.e., 0.0212 mm) as above, for instance, and is a resolution in the main scanning direction of the print image.

If the measured orthogonality is not larger than the minimum control width (No in step S801), the controller 102 of the liquid discharge apparatus 100 does not shift the soft count of the printing position in the operating direction of the carriage 1 and finish an adjustment process. If the measured orthogonality is larger than the minimum control width (Yes in step S801), the controller 102 of the liquid discharge apparatus 100 shifts the soft count of the printing position in the operating direction of the carriage 1 so as to intentionally move the printing position stepwise (step S802).

Figure 9:
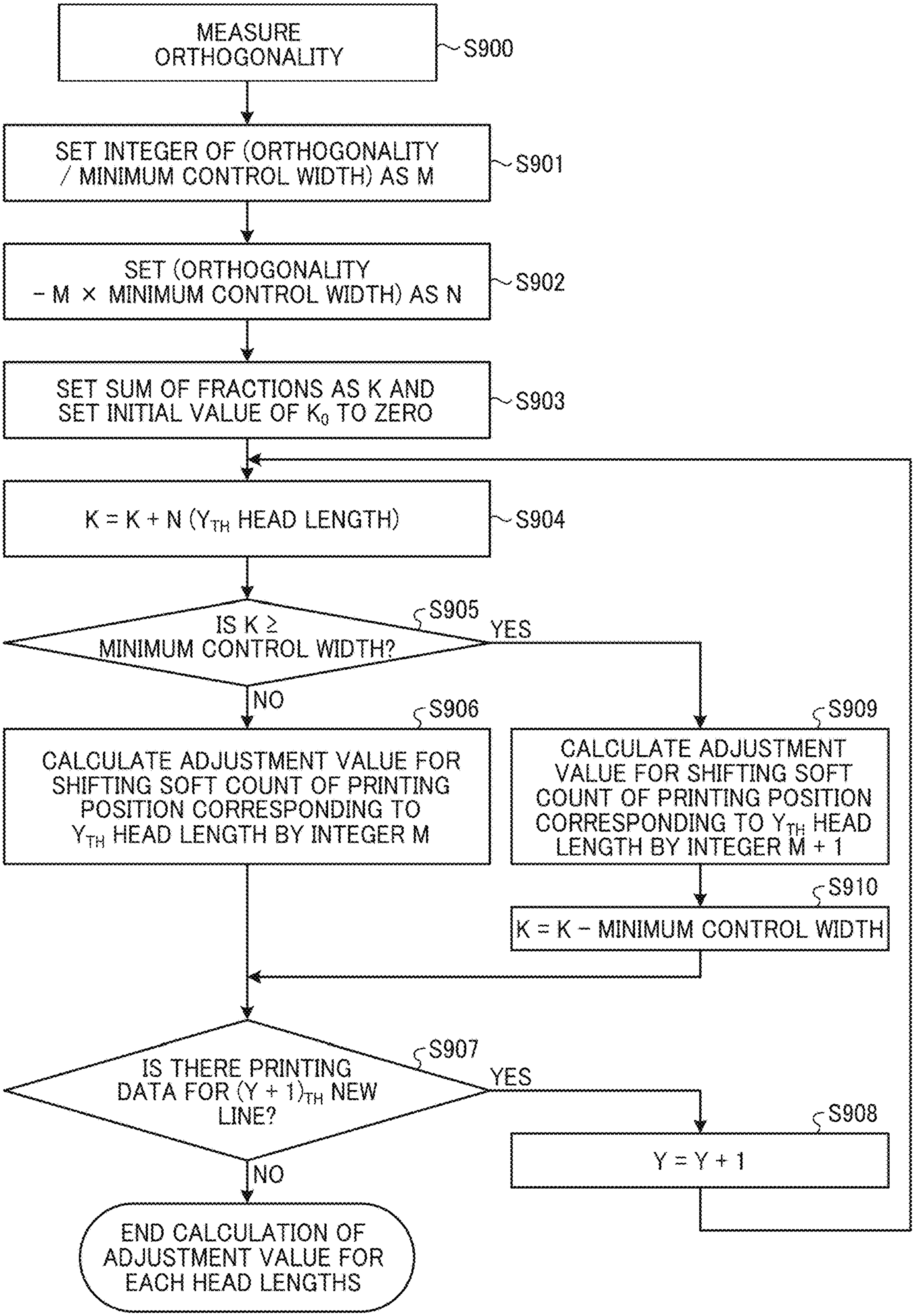
FIG. 9 is a flowchart illustrating an example of a flow of a process for printing position adjustment that is performed by the liquid discharge apparatus according to the embodiment over an entire print image.

FIG. 9 is a flowchart illustrating an example of a flow of a process for printing position adjustment that is performed by the liquid discharge apparatus 100 according to the present embodiment over the entire print image.

FIG. 10 is a diagram for explaining an example of the process for printing position adjustment performed by the liquid discharge apparatus 100 according to the present embodiment.

When the orthogonality between the operating direction of the stage 51 and the operating direction of the carriage 1 has been measured, the controller 102 of the liquid discharge apparatus 100 sets an integer of a value obtained by dividing the measured orthogonality by the minimum control width as an integer M (step S901).

For example, as illustrated in FIG. 10, when the minimum control width is 25 μm and the orthogonality (squareness) is 32 μm, the controller 102 sets 1 as the integer M, which is a value obtained by dividing the orthogonality (squareness) of 32 μm by the minimum control width 25 μm.

Then, the controller 102 sets a value that is obtained by subtracting, from the orthogonality, a value obtained by multiplying the integer M by the minimum control width, as a fraction N (step S902).

For example, the controller 102 sets a value of 7 as the fraction N. The fraction N of 7 is obtained by subtracting a value of 25 from the orthogonality (squareness) of 32 μm. The value of 25 is obtained by multiplying the integer M=1 by the minimum control width 25 μm.

If the orthogonality is 32 μm, the integer M is set to 1, an integer of 32/25, in step S901. In step S902, the orthogonality (32)—the integer M (1)×25=7 is set as the fraction N. In step S903, an initial value of a deviation amount K is set to 0. In step S904, K=K (0)+7 for a first head length. Since 7 is smaller than the minimum control width of 25, the result of determination in step S905 is No. The soft count is shifted by M (1) in step S906.

Since processing is to be continued for a second head length, the result of determination in step S907 is Yes and the processing returns to step S904. In step S904, K=7+7=14. In step S905, 14 is smaller than 25, so that the result of determination in step S905 is No.

Since the processing is to be continued for a third head length, the result of determination in step S907 is Yes and the processing returns to step S904. In step S904, K=14+7=21. In step S905, 21 is smaller than 25, so that the result of determination in step S905 is No.

Since the processing is to be continued for a fourth head length, the result of determination in step S907 is Yes and the processing returns to step S904. In step S904, K=21+7=28. In step S905, 28 is larger than 25, so that the result of determination in step S905 is Yes. In step S909, the soft count is shifted to M (1)+1=2, and K=28-25=3 in step S910.

The controller 102 sets a sum of the fractions N as the deviation amount K (step S903). In addition, the controller 102 sets an initial value K0 of the deviation amount K to 0 (step S903). Then, the controller 102 sets the sum of the deviation amount K and the fraction N as the deviation amount K corresponding to a Yth head length in the sub-scanning direction (step S904). The controller 102 determines whether or not the deviation amount K is equal to or larger than the minimum control width (25 μm, for instance) (step S905).

If the deviation amount K is smaller than the minimum control width (No in step S905), the controller 102 calculates an adjustment value that is a value for shifting the soft count of the printing position corresponding to the Yth head length by the integer M (step S906). The adjustment value is an example of a control parameter. The Yth head length is a Yth line in the sub-scanning direction.

For example, the controller 102 sets the deviation amount K to the initial value K0+7 for the head length: of 1. Since the deviation amount K of 7 is smaller than the minimum control width of 25 μm, the controller 102 determines that the processing in step S905 is No and shifts the soft count by the integer M of 1.

Subsequently, the controller 102 determines whether there is printing data for the Yth head length+a first new line (step S907). If no printing data is present for the Yth head length+the first new line (No in step S907), the controller 102 terminates the calculation of the adjustment value on the respective lines defined by the head length. If printing data is present for the Yth head length+the first new line (Yes in step S907), the controller 102 subjects the Yth head length to increment (step S908), and the processing returns to step S904.

For example, when the head length is 2, the controller 102 determines "Yes" in step S907 and proceeds to step S904. Next, the controller 102 adds the fraction N of 7 to the deviation amount K:7 (step S904). In this case, since the deviation amount of 14 is smaller than the minimum control width of 25 μm in step S905, the controller 102 determines "No" in step S905. When the head length is 3, the controller 102 determines "Yes" in step S907 and proceeds to step S904, for example.

Next, the controller 102 adds the fraction N of 7 to the deviation amount K of 14 (step S904). In this case, since the deviation amount 21 is smaller than the minimum control width 25 μm in step S905, the controller 102 determines "No" in step S905. When the head length is 4, the controller 102 determines "Yes" in step S907 and proceeds to step S904, for example. Next, the controller 102 adds the fraction N of 7 to the deviation amount K of 21 (step S904). In this case, since the deviation amount of 28 is equal to or larger than the minimum control width 25 μm in step S905, the controller 102 determines "Yes" in step S905.

On the other hand, if the deviation amount K is equal to or larger than the minimum control width (Yes in step S905), the controller 102 calculates an adjustment value for shifting the soft count of the printing position corresponding to the Yth head length by the integer M+1 (step S909). The Yth head length is the Yth line in the sub-scanning direction.

For example, when the head length is 4, the controller 102 adds 1 to the integer M to calculate the adjustment value of 2 as the soft count.

In addition, the controller 102 sets a value obtained by subtracting the minimum control width from the deviation amount K as the deviation amount K (step S910), and the processing proceeds to step S907. For example, when the head length is 4, the controller 102 sets a value 3 obtained by subtracting the minimum control width 25 μm from the deviation amount K of 28 as the deviation amount K.

In other words, the controller 102 accumulates values (deviation amounts) smaller than the minimum control width, and performs carrying up when accumulated values surpass one count, so as to move the printing position stepwise while removing errors. By the process as above, the liquid discharge apparatus 100 calculates the adjustment value, which is the soft count of the printing position, for each of the head lengths in the sub-scanning direction on the respective lines, as illustrated in FIG. 10.

As described above, the liquid discharge apparatus 100 according to the present embodiment intentionally moves the printing position in the operating direction of the carriage 1 stepwise and by degrees, so that the color unevenness such as density unevenness, which occurs if the orthogonality between the operating direction of the stage 51 and the operating direction of the carriage 1 deviates, is suppressed. In other words, a print image in which the stepped deviation in the main scanning direction is suppressed is attained when the operating directions of the carriages 1 do not agree with each other in orthogonality to the operating direction of the stage 51.

Aspects of the present invention are as follows, for example.

[Aspect 1]

A liquid discharge apparatus (100) includes: a carriage (1) on which a head (6) configured to discharge a liquid onto a printing medium to print an image is mounted, the carriage being configured to operate in a first operating direction orthogonal to a conveyance direction in which the printing medium is conveyed; and a calculator (102) configured to calculate, each time the printing medium is conveyed, a control parameter for moving, in at least one of the first operating direction or the conveyance direction, a printing position in the first operating direction of the carriage.

[Aspect 2]

In the liquid discharge apparatus according to claim 1, includes: a stage (51) on which the printing medium is mounted, and a rail (5) configured to allow the stage to operate. The first operating direction and a rail extending direction in which the rail extends are orthogonal to each other. The stage operates in the rail extending direction. The calculator calculates the control parameter to adjust the orthogonality between the first operating direction and the direction in which the rail extends in each time the printing medium is conveyed. The control parameter is calculated by moving the printing position of the carriage in the first operating direction in at least one of the first operating direction or the conveyance direction.

[Aspect 3]

In the liquid discharge apparatus according to claim 1 or 2, wherein the carriage includes multiple carriages (1A, 1B).

[Aspect 4]

In the liquid discharge apparatus according to claim 3, wherein the calculator calculates the control parameter for each of the multiple carriages.

[Aspect 5]

In the liquid discharge apparatus according to any one of claims 1 through 4, further includes a printing unit (1) configured to print an adjustment image including an image indicating a conveyance position of the printing medium

[Aspect 6]

A liquid discharge apparatus (100) includes: a liquid discharge head (6) configured to discharge a liquid onto a printing medium to form an image on the printing medium; a conveyor (50) configured to convey the printing medium to the liquid discharge head (6) in a conveyance direction; a carriage (1) mounting the liquid discharge head (6), the carriage (1) configured to move the liquid discharge head (6) in a first direction orthogonal to the conveyance direction; and circuitry (102) configured to calculate a control parameter to shift a printing position of the liquid discharge head (6) in at least one of the first direction or the conveyance direction for each time the conveyor (50) conveying the printing medium.

[Aspect 7]

In the liquid discharge apparatus according to aspect 6, the conveyor (50) includes: a stage (51) onto which the printing medium is placed; and a rail (5) extending in the conveyance direction in which the stage (51) is moved. The circuitry (102) calculates the control parameter to move the printing position in at least one of the first direction or the conveyance direction to adjust orthogonality between the first direction and the conveyance direction for each time the conveyor conveying the printing medium.

[Aspect 8]

In the liquid discharge apparatus according to aspect 6 or 7, the circuitry (102) calculates the control parameter to shift the printing position of the liquid discharge head (6) in the first direction stepwise for each line feed of the printing medium by the conveyor (50).

[Aspect 9]

In the liquid discharge apparatus according to any one of aspects 6 to 8, the carriage includes multiple carriages (1A, 1B).

[Aspect 10]

In the liquid discharge apparatus according to aspect 9, the circuitry (102) calculates the control parameter for each of the multiple carriages (1A, 1B).

[Aspect 11]

In the liquid discharge apparatus according to any one of aspects 91 through 10, the liquid discharge head (6) prints an adjustment image indicating a conveyance position of the printing medium.

In the above described embodiment of the present disclosure, any constituent element is appropriately changed, added or removed without departing from the gist of the present disclosure. The present disclosure is not limited to the embodiment as described above, and many modifications can be made by a person with ordinary skill in the art within the technical idea of the present disclosure.

Any one of the above-described operations may be performed in various other ways, for example, in an order different from the one described above.

The present invention can be implemented in any convenient form, for example using dedicated hardware, or a mixture of dedicated hardware and software. The present invention may be implemented as computer software implemented by one or more networked processing apparatuses. The processing apparatuses include any suitably programmed apparatuses such as a general purpose computer, a personal digital assistant, a Wireless Application Protocol (WAP) or third-generation (3G)-compliant mobile telephone, and so on. Since the present invention can be implemented as software, each and every aspect of the present invention thus encompasses computer software implementable on a programmable device.

The computer software can be provided to the programmable device using any conventional carrier medium (carrier means). The carrier medium includes a transient carrier medium such as an electrical, optical, microwave, acoustic or radio frequency signal carrying the computer code. An example of such a transient medium is a Transmission Control Protocol/Internet Protocol (TCP/IP) signal carrying computer code over an IP network, such as the Internet. The carrier medium may also include a storage medium for storing processor readable code such as a floppy disk, a hard disk, a compact disc read-only memory (CD-ROM), a magnetic tape device, or a solid state memory device.

The functionality of the elements disclosed herein such as the head drive controller 102 may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

Numerous additional modifications and variations are possible in light of the above teachings. Such modifications and variations are not to be regarded as a departure from the scope of the present disclosure and appended claims, and all such modifications are intended to be included within the scope of the present disclosure and appended claims.

The invention claimed is:

1. A liquid discharge apparatus comprising:

a liquid discharge head configured to discharge a liquid onto a printing medium to form an image on the printing medium;

a conveyor configured to convey the printing medium to the liquid discharge head in a conveyance direction;

a carriage mounting the liquid discharge head, the carriage configured to move the liquid discharge head in a first direction orthogonal to the conveyance direction;

circuitry configured to measure an amount of deviation in a main scanning direction of lines which are adjacent to each other; and circuitry configured to calculate, using the amount of deviation that has been measured, a control parameter to shift a printing position of the liquid discharge head in at least one of the first direction or the conveyance direction each time the conveyor conveying the printing medium.

2. The liquid discharge apparatus according to claim 1, wherein the conveyor includes:

a stage onto which the printing medium is placed; and a rail extending in the conveyance direction in which the stage is moved, and wherein the circuitry calculates the control parameter to move the printing position in at least one of the first direction or the conveyance direction to adjust orthogonality between the first direction and the conveyance direction each time the conveyor conveys the printing medium.

3. The liquid discharge apparatus according to claim 1, wherein:

the circuitry calculates the control parameter to stepwise shift the printing position of the liquid discharge head in the first direction for each line feed of the printing medium by the conveyor.

4. The liquid discharge apparatus according to claim 1, wherein:

the carriage includes multiple carriages.

5. The liquid discharge apparatus according to claim 4, wherein:

the circuitry calculates the control parameter for each of the multiple carriages.

6. The liquid discharge apparatus according to claim 1, wherein:

the liquid discharge head prints an adjustment image indicating a conveyance position of the printing medium, the adjustment image including the lines which are adjacent to each other.

7. The liquid discharge apparatus according to claim 6, wherein:

the lines are vertical lines each having rifts at intervals which are a length of the liquid discharge head.

8. The liquid discharge apparatus according to claim 1, wherein:

the lines correspond to a theoretical straight line, and the circuitry configured to measure measures the amount of deviation which is a difference between the theoretical straight line and the lines which are adjacent to each other.

9. The liquid discharge apparatus according to claim 1, wherein:

the circuitry configured to calculate the control parameter sets the control parameter to shift at least one of the lines when the amount of deviation is greater than a predetermined threshold, and the circuitry configured to calculate the control parameter does not set the control parameter to shift at least one of the lines when the amount of deviation is not greater than the predetermined threshold.

10. The liquid discharge apparatus according to claim 9, wherein:

when the circuitry configured to calculate the control parameter sets the control parameter to shift at least one of the lines, the circuitry shifts a soft count of the printing position, and when the circuitry configured to calculate the control parameter does not set the control parameter to shift at least one of the lines, the circuitry does not shift the soft count of the printing position.

* * * * *